(12) United States Patent
Buzard

(10) Patent No.: US 6,754,932 B2
(45) Date of Patent: Jun. 29, 2004

(54) LUG NUT AND HUB CAP AND RIM RECEPTACLE CLEANING DEVICE

(76) Inventor: Richard A. Buzard, 204 Hardwood Dr., Venetia, PA (US) 15367

( * ) Notice: Subject to any disclaimer, the term of this patent is extended or adjusted under 35 U.S.C. 154(b) by 129 days.

(21) Appl. No.: 10/233,937

(22) Filed: Sep. 4, 2002

(65) Prior Publication Data

US 2004/0040113 A1 Mar. 4, 2004

(51) Int. Cl.$^7$ ................................................ A47L 25/00
(52) U.S. Cl. ........................ 15/244.1; 15/118; 15/210.1
(58) Field of Search ............................... 15/118, 210.1, 15/211, 229.11, 244.1

(56) References Cited

U.S. PATENT DOCUMENTS

| | | | | |
|---|---|---|---|---|
| 1,936,259 A | * | 11/1933 | Parmer | 15/211 |
| 3,135,003 A | * | 6/1964 | Wise | 15/244.1 |
| 3,913,165 A | * | 10/1975 | Behnk | 15/244.1 |
| 4,117,566 A | * | 10/1978 | Ward | 15/244.1 |
| 6,067,686 A | * | 5/2000 | Gronkiewicz | 15/244.4 |
| 6,470,526 B2 | * | 10/2002 | Large | 15/244.1 |

* cited by examiner

Primary Examiner—Mark Spisich
(74) Attorney, Agent, or Firm—Paul Bogdon

(57) ABSTRACT

A device for cleaning vehicular lug nuts or lug nut covers and the surfaces of lug nut or lug nut cover receiving receptacles of hub caps or rims. The device includes scouring fingers pivotably mounted on a base member and defining a socket for receiving the outer sections of lug nuts or the entirety of lug nut covers. The inner surfaces of the scouring fingers engage for cleaning the lug nut or lug nut cover. A scouring pad is mounted on the inner end of a reciprocating shaft supported by the base member. The scouring pad engages for cleaning the end surfaces of a lug nut or lug nut cover, and is shaped to selectively engage the inner surfaces of the scouring fingers to urge them radially into cleaning engagement with the receptacle surface when the shaft is moved axially into the socket formed by the scouring fingers. Reciprocating or rotating this device will serve to scour the lug nut or lug nut cover and receptacle surfaces.

7 Claims, 1 Drawing Sheet

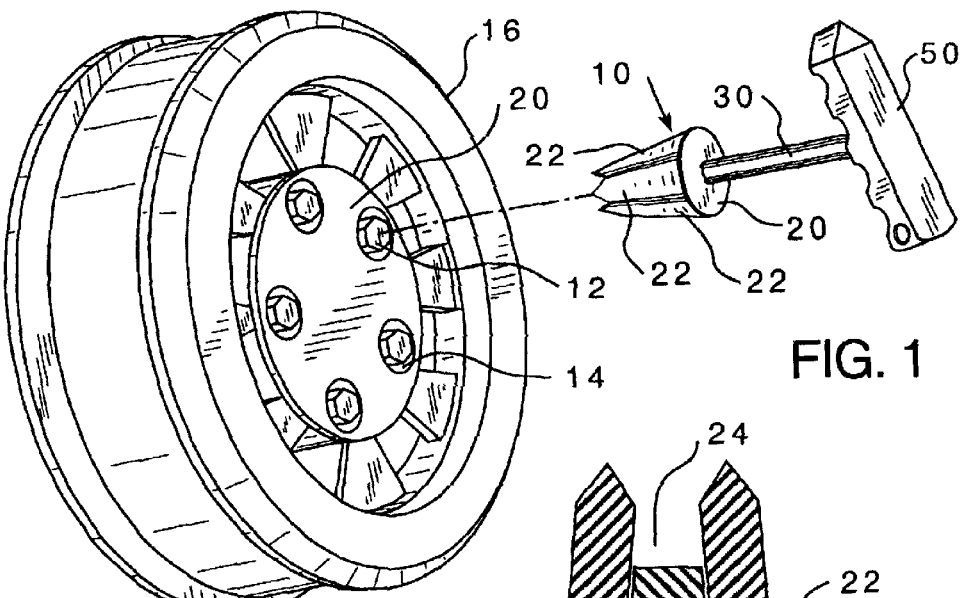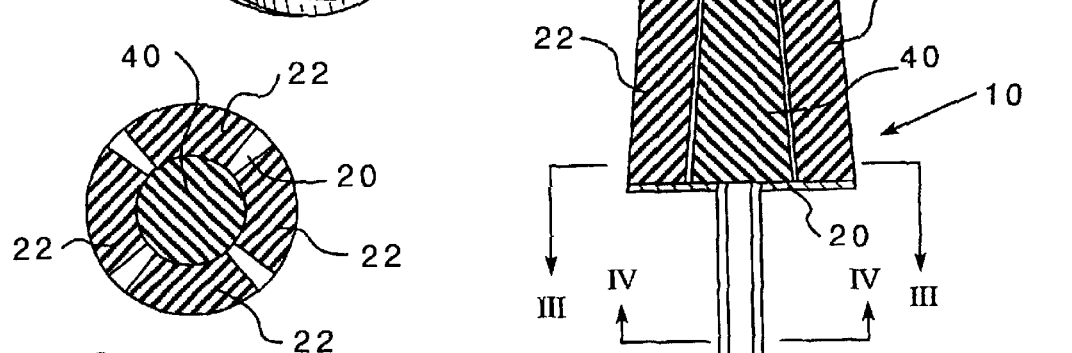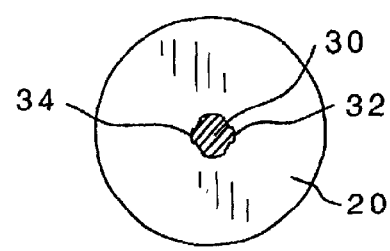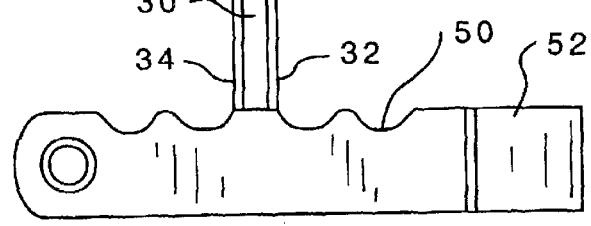

LUG NUT AND HUB CAP AND RIM RECEPTACLE CLEANING DEVICE

BACKGROUND OF THE INVENTION

1. Field of Invention

This invention relates generally to a device for cleaning vehicular lug nuts and the surfaces of receptacles of hub caps and rims, the receptacles receiving lug nuts or lug nut covers.

2. Description of the Prior Art

Wheels of vehicles, and particularly automobiles, may be provided with hub caps having spaced receptacles containing lug nut wheel covers, appearing as lug nuts, or rims with spaced receptacles into which are received the exterior ends of lug nuts. Cleaning the lug nuts and surfaces of the receptacles has been somewhat difficult because of the tight clearances between the lug nuts and covers, and the surfaces of the receptacles. The tight clearances do not permit finger or standard cleaning brush entry into the receptacles and around the lug nuts. Also, the receptacle sizes differ on the various designs of hub caps and rims. Some of the receptacles are close in size to the lug nuts and covers while others provide wider clearances. There have been no known suitable devices provided which would allow cleaning of the various sized receptacles and lug nuts and lug nut covers used on today's vehicles. Several patented cleaning devices have been disclosed without being presented in the market place. U.S. Pat. No. 4,117,566 discloses a lug nut cleaning device which fails to provide for cleaning the surfaces of varying sized receptacles, of hub caps or rims. The device of U.S. Pat. No. 4,117,566 appears to be limited to use with single sized lug nuts, requiring several sized devices to accommodate the various sized lug nuts and receptacles. Limitations of the cleaning device of U.S. Pat. No. 4,117,566 would also apply to the complex structure of the wheel lug cleaning tool of U.S. Pat. No. 5,123,763.

The present invention provides a simple and effect device for cleaning lug nuts and the surfaces of hub cap and rim receptacles of various sizes and dimensions. It is configured to be emplaced within the receptacles to generally surround the lug nuts or lug nut covers, rotated or reciprocated to scour the external surfaces, and to be expanded, if need be, to engage and scour the surfaces of receptacles.

SUMMARY OF THE INVENTION

The present invention provides a device for cleaning the outer surfaces of the vehicular lug nuts and hub cap and rim receptacles which receive actual lug nuts or lug nut covers. The preferred embodiment of the cleaning device includes a generally circular base member on which are pivotably secured a plurality, four for example, of radially spaced, elongated scouring resilient fingers defining an inner socket sized and shaped to receive lug nuts or lug nut covers of various sizes. An elongated shaft is supported by the base member and is reciprocally moveable within the socket defined by the scouring fingers. A scouring pad is secured to the inner end of the shaft and would be urged into scouring engagement of the free end of a lug nut or lug nut cover. The scouring pad is shaped and sized to engage the inner surfaces of the scouring fingers to urge them radially outwardly when the shaft member is axially moved into the confines of the socket, whereby the exterior surfaces of the scouring fingers engage for scouring the surface of a hub cap or rim receptacle.

The basic structure of the cleaning device of the present invention is simple in construction, relatively inexpensive to produce, and uncomplicated to use. The scouring fingers are simply inserted over the lug nut or lug nut covers, the device rotated or reciprocated to scour the external surfaces while the scouring pad cleans the outer, free end of the lug nut or lug nut covers. The external surfaces of the scouring fingers might at the same time engage the inner surfaces of the receptacle or they are scouring the lug nut or lug nut If the size of the receptacle requires the shaft would be axially moved inwardly to urge outward forces on the scouring fingers to move them radially outwardly into scouring engagement with the surface of the receptacle. The surfaces may be scoured and cleaned by rotating or reciprocating the device in place in the hub cap or rim receptacle.

Various other advantages, details, and modifications of the present invention will become apparent as the following description of a certain present preferred embodiment proceeds.

BRIEF DESCRIPTION OF THE DRAWINGS

In the accompanying drawings I show a certain present preferred embodiment of my invention in which:

FIG. 1 is a perspective view showing the Lug Nut and Hub Cap and Rim Receptacle Cleaning Device of the present invention aligning for engagement of a lug nut and rim receptacle;

FIG. 2 is an elevation view of the Device of this invention, partially in section to show details of construction.

FIG. 3 is a view along the line III—III of FIG. 2;

FIG. 4 is a view along the line IV—IV of FIG. 2;

DESCRIPTION OF A PREFERRED EMBODIMENT

Referring now to the drawings, there is shown a device 10 for cleaning a vehicular, preferably an automobile, lug nut 12 and the surface of the receptacle 14 of a rim 16 or hub cap. FIG. 1 shows a rim 16 which has five receptacles 14 into which are received the exposed or free ends of lug nuts 12. There are also used hub caps, not illustrated, which are provided with simulated lug nuts serving as covers for the actual lug nuts used to secure the vehicle tire. The device 10 is useable with either rim 16-lug nut 12 or hub cap-lug nut cover arrangements.

The cleaning device 10 includes a circular disc-shaped base member 20 upon which are pivotably secured four radially spaced elongated resilient scouring fingers 22 inclined inwardly and defining a socket 24 for receiving the exposed end of a lug nut 12. The scouring fingers 22 are formed of a suitable resilient sponge-like material and would allow return of the scouring fingers 22 to their initial position whenever an outwardly biasing force is removed therefrom. An elongated shaft 30 having oppositely formed ribs 32 and 34 thereon is supported by the base member 20 for selective axial reciprocal movement with respect to the base member and for selective rotational movement of the base member and the scouring fingers 22. Fixed to the inner end of the shaft 30 is a truncated, conical shaped resilient scouring pad 40 which extends into the socket 24 and generally engages the inner surfaces of the scouring fingers 22. A handle 50 is secured perpendicularly to the outer end of the shaft 30 and is suitably sized and shaped to be comfortably grasped by the hand of a user. A generally triangular shaped cleaning sponge 52 is secured to one of the ends of the handle 50 for use in cleaning other tight openings of a rim or hub caps. The free ends of the scouring fingers 22 are triangularly shaped for penetrating into any accumulated debris on the inner end surface of a receptacle 14.

In its use the device 10 is grasped on the handle 50 and inserted into the rim receptacle 14 whereby the exposed part of the lug nut 12 is received in the socket 24 and engaged by the upper inner surfaces of the scouring fingers 22 with the remote end of the lug nut 12 being engaged by the inner end of the scouring pad 40. Depending on size, the outer upper surfaces of the scouring fingers 22 engage the surface of the rim receptacle 14. Rotating and/or reciprocating the device 10 will serve to scour and clean the lug nut 12 and receptacle 14 surfaces. Should the size of a rim receptacle be such that initial insertion of the device 10 into that receptacle not result in the scouring fingers 22 engaging the receptacle surface, the user would axially move the shaft 30 into the socket 24 whereby the truncated scouring pad 40 will urge a force on the scouring fingers 22 to radially pivot them into engagement with the surface of the receptacle. With the scouring fingers 22 engaging both the lug nuts 12 and the receptacle 14 the device 10 may be reciprocated and/or rotated to scour and clean the lug nut 12 and the receptacle surface. Reciprocating the shaft 30 and scouring pad 40 outwardly will result in the scouring fingers 22 returning to their initial positions. The pointed, triangular end sections of the scouring fingers 22 will serve to loosen debris accumulated in the inner end portion of a receptacle 14, as the device is rotated.

It would be clearly apparent to one skilled in the art of lug nut-receptacle cleaning devices and apparatus that modifications could be made to the structure of this invention as described herein.

While I have shown and described a present preferred embodiment of this invention, it is to be distinctly understood that the invention is not limited thereto, but may be otherwise embodied within the scope of the following claims.

I claim:

1. A lug nut and hub cap and rim receptacle cleaning device, comprising:

a base member;

resilient first cleaning means mounted on said base member defining an inner socket sized and shaped to receive a lug nut for engaging and scouring the outer surfaces of a lug nut;

said first cleaning means constructed and arranged on said base member for selective movement radially outwardly and to return to its initial position;

an elongated shaft member supported by said base member and reciprocally moveable within said socket;

resilient second cleaning means secured within said socket to one end section of said shaft member for engaging and scouring the free end of a lug nut and for urging a radially outwardly directed force on the inner surface of said first cleaning means to urge said first cleaning meaning radially outwardly upon axial movement of said shaft member into the confines of said socket for scouring engagement of said first cleaning means with the surface of a hub cap receptacle.

2. A lug nut and hub cap and rim receptacle cleaning device as set forth in claim 1 wherein said base member is generally circular in shape; said first cleaning means includes a plurality of radially spaced, elongated finger members pivotably fixed to said base member.

3. A lug nut and hub cap and rimreceptacle cleaning device as set forth in claim 1 wherein said first cleaning means is moveable from a fixed position and is returnable to its fixed position.

4. A lug nut and hub cap and rim receptacle cleaning device as set forth in claim 1 including a handle member secured to the other end section of said shaft member.

5. A lug nut and hub cap and rim receptacle cleaning device as set forth in claim 1 wherein said first cleaning means defines a truncated conical socket; and said second cleaning means is complimentary in shape to said truncated conical socket.

6. A lug nut and hub cap and rim receptacle cleaning device as set forth in claim 1 wherein said first cleaning means is further constructed and arranged to engage and loosen any debris within said hub cap receptacle.

7. A lug nut and hub cap and rim receptacle cleaning device as set forth in claim 1 wherein said first and second cleaning means are formed of sponge-like material.

* * * * *